United States Patent
Fukamachi et al.

(10) Patent No.: US 11,401,420 B2
(45) Date of Patent: Aug. 2, 2022

(54) COMPOSITION, FIBER TREATMENT AGENT, FIBER TREATMENT METHOD, AND TREATED FIBER

(71) Applicant: SHIN-ETSU CHEMICAL CO., LTD., Tokyo (JP)

(72) Inventors: Takumi Fukamachi, Annaka (JP); Shunji Aoki, Annaka (JP); Yuta Hamajima, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 287 days.

(21) Appl. No.: 16/462,830

(22) PCT Filed: Nov. 16, 2017

(86) PCT No.: PCT/JP2017/041286
§ 371 (c)(1),
(2) Date: May 21, 2019

(87) PCT Pub. No.: WO2018/097028
PCT Pub. Date: May 31, 2018

(65) Prior Publication Data
US 2020/0062960 A1  Feb. 27, 2020

(30) Foreign Application Priority Data

Nov. 25, 2016  (JP) .............................. JP2016-228605

(51) Int. Cl.

| | | |
|---|---|---|
| *D06M 15/333* | (2006.01) | |
| *C08L 83/04* | (2006.01) | |
| *C08J 7/12* | (2006.01) | |
| *C08K 5/54* | (2006.01) | |
| *C08L 29/04* | (2006.01) | |
| *D06M 13/513* | (2006.01) | |
| *D06M 15/643* | (2006.01) | |

(52) U.S. Cl.
CPC ............... *C08L 83/04* (2013.01); *C08J 7/12* (2013.01); *C08K 5/54* (2013.01); *C08L 29/04* (2013.01); *D06M 13/513* (2013.01); *D06M 15/333* (2013.01); *D06M 15/6436* (2013.01)

(58) Field of Classification Search
CPC ...... C08G 77/26; C08G 77/46; C08G 81/025; C09D 183/12; C08L 29/04; D06M 13/513; D06M 13/333
See application file for complete search history.

(56) References Cited

U.S. PATENT DOCUMENTS

| | | | | |
|---|---|---|---|---|
| 4,680,366 | A * | 7/1987 | Tanaka .................. | C08G 77/26 |
| | | | | 528/27 |
| 2014/0109795 | A1 | 4/2014 | Hirai | |
| 2017/0029555 | A1 | 2/2017 | Hamajima et al. | |
| 2021/0032804 | A1* | 2/2021 | Hamajima ........... | C08G 77/385 |

FOREIGN PATENT DOCUMENTS

| | | |
|---|---|---|
| CN | 1302928 A | 7/2001 |
| JP | 63-51314 A | 3/1988 |
| JP | 5-310539 A | 11/1993 |
| JP | 9-21071 A | 1/1997 |
| JP | 2006-136351 A | 6/2006 |
| JP | 2006136351 * | 6/2006 |
| JP | 2014-84398 A | 5/2014 |
| JP | 2015-199886 A | 11/2015 |

OTHER PUBLICATIONS

JP 2006 136351 machine translaltion (2006).*
International Search Report for PCT/JP2017/041286 dated Jan. 16, 2018.
Written Opinion of the International Searching Authority for PCT/JP2017/041286 (PCT/ISA/237) dated Jan. 16, 2018.
Chinese Office Action and Search Report, dated Apr. 6, 2021, for Chinese Application No. 201780072454.1, along with an English machine translation of the Chinese Office Action.
Extended European Search Report, dated June 8. 2020, for European Application No. 17873472.9.
Chinese Office Action and Search Report for Chinese Application No. 201780072454.1, dated Sep. 3, 2021.
Shi et al., "Synthesis and Application of Polyether-modified Aminosilicone," Journal of Beijing Institute of Clothing Techology, vol. 31, No. 2, Apr. 2011, pp. 36-44, with an English translation.
Chinese Office Action and Search Report for Chinese Application No. 201780072454.1, dated Dec. 22, 2021.

* cited by examiner

*Primary Examiner* — Kuo Liang Peng
(74) *Attorney, Agent, or Firm* — Birch, Stewart, Kolasch & Birch, LLP

(57) ABSTRACT

Provided is a composition that imparts an excellent flexibility to post-treatment fibers and textiles, provides a water-absorptive fiber surface and provides an excellent durability, and can maintain the water absorbency of the fiber surface even after a laundry treatment. Also provided is a fiber treatment agent that contains said composition as an effective component. The composition contains the following component (A) and component (B) wherein the content ratio on a mass basis represented by component (A)/[component (A)+component (B)] is 0.01-1. Component (A) is an organopolysiloxane represented by general formula (1) or a silane represented by general formula (2), and component (B) is water.

6 Claims, No Drawings

COMPOSITION, FIBER TREATMENT AGENT, FIBER TREATMENT METHOD, AND TREATED FIBER

TECHNICAL FIELD

The present invention relates to a composition which imparts high water absorbency, high durability to laundering and good softness to textile fibers and products, and to a textile fiber or textile product treated with such a composition. More specifically, the invention relates to a composition which includes a specific aminoalkyl group-containing polysiloxane and water.

BACKGROUND ART

A variety of organopolysiloxanes, such as dimethylpolysiloxanes, epoxy group-containing polysiloxanes and aminoalkyl group-containing polysiloxanes, are widely used as treatments for conferring properties such as softness and smoothness to various types of textile fibers and products. Of these, frequent use is made of aminoalkyl group-containing organopolysiloxanes, which have the ability to impart an especially good softness to a variety of textile fibers and products. In particular, textile treatments in which the base compound is an organopolysiloxane having aminoalkyl groups such as —$C_3H_6NH_2$ or —$C_3H_6NHCH_2CH_2NH_2$ exhibit excellent softening properties and are thus widely used.

However, given that a material treated with an aminoalkyl group-containing polysiloxane generally becomes water-repelling, even inherently water-absorbing textile fibers exhibit hydrophobic properties following treatment, as a result of which, when used in apparel or the like, their ability to absorb perspiration during sweating is substantially lost. Studies aimed at conferring textile fibers with both softness and water absorbency have hitherto been carried out. For example, the water absorbency is improved by including aminoalkyl groups and polyoxyalkylene groups onto the same polysiloxane molecule, but including polyoxyalkylene groups greatly lowers such properties as softness and smoothness. One way of ameliorating this drawback that has been described is to modify the aminoalkyl groups by reacting an aminoalkyl group-containing polysiloxane with a polyoxyalkylene glycidyl ether compound (JP-A 2014-084398).

By using such modified aminoalkyl group-containing polysiloxanes as textile treatments, textile fibers can be imparted with both softness and water absorbency. However, the water absorbency effect drops off markedly when laundering is carried out. Hence, there exists a desire for the development of a textile treatment having excellent durability to laundering that is able to maintain both softness and water absorbency even after laundering.

PRIOR ART DOCUMENTS

Patent Documents

Patent Document 1: JP-A 2014-084398

SUMMARY OF INVENTION

Technical Problem

It is therefore an object of the present invention to provide a composition which imparts a good softness to textile fibers and products treated therewith, exhibits water absorbency at the fiber surfaces, and moreover has an excellent durability and can maintain the water absorbency of the fiber surfaces even after laundering. Another object of the invention is to provide a textile treatment which contains such a composition as the active ingredient.

Solution to Problem

The inventors have conducted extensive investigations in order to achieve these objects. As a result, they have discovered that compositions which include an aminoalkyl group-containing polysiloxane of a specific structure have an excellent durability to laundering. The inventors have also found that such compositions, and textile treatments containing such compositions as the active ingredient, when used on textile fibers and products, impart high water absorbency and good softness following treatment, and that the high water absorbency can be maintained even after laundering. The inventors have learned moreover that, by using compositions obtained by adding polyvinyl alcohol to the foregoing compositions, or by using textile treatments containing the resulting compositions, on textile fibers and products, the water repellency and durability to laundering can be further enhanced.

Accordingly, the present invention provides the following composition, textile treatment, method for treating textile fibers and textile products, and textile fiber or textile product.

[1] A composition which includes:
 (A) an organopolysiloxane of general formula (1) below or a silane of general formula (2) below

[Chem. 1]

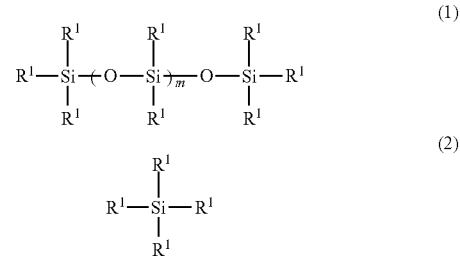

[wherein each $R^1$ is independently a hydrogen atom, a hydroxyl group, a substituted or unsubstituted monovalent hydrocarbon group of 1 to 20 carbon atoms, an alkoxy group of 1 to 10 carbon atoms or an $R^2$ group, with the proviso that at least one $R^1$ is an $R^2$ group; the subscript 'm' is an integer of less than 40; and $R^2$ is a moiety of general formula (3) below

[Chem. 2]

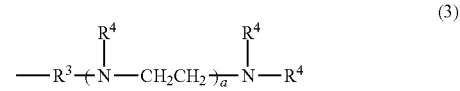

(wherein $R^3$ is a divalent hydrocarbon group of 1 to 8 carbon atoms, the subscript 'a' is an integer from 0 to 4, each $R^4$ is independently a hydrogen atom, a substituted or unsubstituted monovalent hydrocarbon group or acyl group of 1 to 10 carbon atoms, or a polyoxyalkylene-containing organic group of the formula —$CH_2$—CH(OH)$CH_2$O—($C_2H_4$O)$_b$—($C_3H_6$O)$_c$—$R^5$ (wherein $R^5$ is a hydrogen atom or a substituted or unsubstituted monovalent hydrocarbon group or acyl group of 1 to 12 carbon atoms; the subscript 'b' is an integer from 2 to 30; the subscript 'c' is an integer from 0 to 20; and the oxyethylene unit and oxypropylene unit may form a block polymer or may form a random polymer), with the proviso that at least one $R^4$ is —$CH_2$—CH(OH)$CH_2$O—($C_2H_4$O)$_b$—($C_3H_6$O)$_c$—$R^5$)], and (B) water, wherein components A and B are included in a weight ratio, expressed as [component A/(component A+component B)], of from 0.005 to 1.

[2] The composition of [1], further including (C) polyvinyl alcohol or modified polyvinyl alcohol in a weight ratio, expressed as [component C/(component B+component C)], of from 0.001 to 0.05.

[3] The composition of [1] or [2], wherein the subscript 'm' in general formula (1) is an integer from 0 to 30.

[4] The composition of any of [1] to [3], wherein at least 50% of the total number of $R^4$ groups in component A are groups of the formula —$CH_2$—CH(OH)$CH_2$O—($C_2H_4$O)$_b$—($C_3H_6$O)$_c$—$R^5$.

[5] A textile treatment which includes, as an active ingredient, the composition of any of [1] to [4].

[6] A method for treating textile fibers and textile products, which method includes the step of depositing component A on a textile fiber or textile product by coating the textile fiber or textile product with or dipping the textile fiber or textile product in the composition of any of [1] to [4] and subsequently drying at between 80 and 200° C.

[7] A textile fiber or textile product treated with the composition of any of [1] to [4].

Advantageous Effects of Invention

The composition of the invention and the inventive textile treatment containing this composition as an active ingredient impart good softness and high water absorbency to textile fibers, and enable these effects to be maintained even after laundering. These effects are applicable even to polypropylene (PP) and other textile fibers for which maintaining water absorbency has hitherto been extremely difficult.

DESCRIPTION OF EMBODIMENTS

The invention is described more fully below.

The inventive composition includes components A and B below in a weight ratio, expressed as [component A/(component A+component B)], of from 0.005 to 1.

[Component A]

Component A is an organopolysiloxane of general formula (1) below or a silane of general formula (2) below.

[Chem. 3]

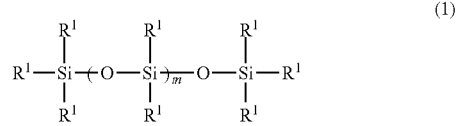
(1)

(2)

In these formulas, each $R^1$ is independently a hydrogen atom, a hydroxyl group, a substituted or unsubstituted monovalent hydrocarbon group of 1 to 20 carbon atoms, an alkoxy group of 1 to 10 carbon atoms or an $R^2$ group, with the proviso that at least one $R^1$ is an $R^2$ group; and the subscript 'm' is an integer of less than 40.

$R^2$ is a group of general formula (3) below

[Chem. 4]

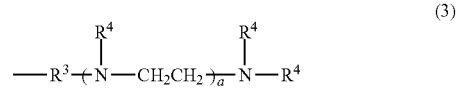
(3)

(wherein $R^3$ is a divalent hydrocarbon group of 1 to 8 carbon atoms, the subscript 'a' is an integer from 0 to 4, each $R^4$ is independently a hydrogen atom, a substituted or unsubstituted monovalent hydrocarbon group or acyl group of 1 to 10 carbon atoms, or a polyoxyalkylene-containing organic group of the formula —$CH_2$—CH(OH)$CH_2$O—($C_2H_4$O)$_b$—($C_3H_6$O)$_c$—$R^5$ (wherein $R^5$ is a hydrogen atom or a substituted or unsubstituted monovalent hydrocarbon group or acyl group of 1 to 12 carbon atoms; the subscript 'b' is an integer from 2 to 30; the subscript 'c' is an integer from 0 to 20; and the oxyethylene unit and oxypropylene unit may form a block polymer or may form a random polymer), with the proviso that at least one $R^4$ moiety is —$CH_2$—CH(OH)$CH_2$O—($C_2H_4$O)$_b$—($C_3H_6$O)$_c$—R).

Each $R^1$ is independently a hydrogen atom, a hydroxyl group, a substituted or unsubstituted monovalent hydrocarbon group of 1 to 20 carbon atoms, an alkoxy group of 1 to 10 carbon atoms or a $R^2$ group. At least one $R^1$ group is an $R^2$ group; i.e., the number of $R^1$ groups that are $R^2$ groups may be one, two or more. Illustrative examples of the monovalent hydrocarbon groups include alkyl groups such as methyl, ethyl, propyl, butyl, pentyl, hexyl, heptyl, octyl, nonyl, decyl, dodecyl, tetradecyl, hexadecyl, octadecyl and eicosyl groups; cycloalkyl groups such as cyclopentyl and cyclohexyl groups; aryl groups such as phenyl and tolyl groups; alkenyl groups such as vinyl and allyl groups; and halogenated alkyl groups and halogenated alkenyl groups in which some or all carbon-bonded hydrogen atoms in the aforementioned groups are substituted with halogen atoms such as chlorine or fluorine. $R^1$ groups other than $R^2$ groups are preferably hydroxyl groups, monovalent hydrocarbon groups of 1 to 10 carbon atoms or alkoxy groups of 1 to 5 carbon atoms, and more preferably methyl, ethyl, methoxy or ethoxy groups. The organopolysiloxane or silane preferably has an alkoxy group of 1 to 10 carbon atoms at one end and a side chain that is a monovalent hydrocarbon group of 1 to 20 carbon atoms, and more preferably has alkoxy groups of 1 to 10 carbon atoms at both ends.

The subscript 'm' is an integer of less than 40, preferably from 0 to 30, more preferably from 0 to 20, and even more preferably from 1 to 20. When 'm' is 40 or more, the desired water absorbency is difficult to obtain.

$R^2$ is a polyoxyalkylene-containing organic group of general formula (3) below.

[Chem. 5]

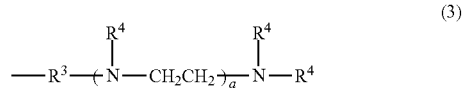
(3)

In this formula, $R^3$ is a divalent hydrocarbon group of 1 to 8 carbon atoms, the subscript 'a' is an integer from 0 to 4, each $R^4$ is independently a hydrogen atom, a substituted or unsubstituted monovalent hydrocarbon group or acyl group of 1 to 10 carbon atoms, or a polyoxyalkylene-containing organic group of the formula —$CH_2$—$CH(OH)CH_2O$—$(C_2H_4O)_b$—$(C_3H_6O)_c$—$R^5$ (wherein $R^5$ is a hydrogen atom or a substituted or unsubstituted monovalent hydrocarbon group or acyl group of 1 to 12 carbon atoms; the subscript 'b' is an integer from 2 to 30; the subscript 'c' is an integer from 0 to 20; and the oxyethylene unit and oxypropylene unit may form a block polymer or may form a random polymer), with the proviso that at least one $R^4$ is —$CH_2$—$CH(OH)CH_2O$—$(C_2H_4O)_b$—$(C_3H_6O)_c$—$R^5$.

$R^3$ is a divalent hydrocarbon group of 1 to 8 carbon atoms. The divalent hydrocarbon group is preferably an alkylene group, examples of which include methylene, ethylene, propylene and butylene groups. Of these, a propylene group is preferred. The subscript 'a' is an integer from 0 to 4, and preferably 1 or 2. Each $R^4$ is independently a hydrogen atom, a substituted or unsubstituted monovalent hydrocarbon group or acyl group of 1 to 10 carbon atoms, or a polyoxyalkylene-containing organic group of the formula —$CH_2$—$CH(OH)CH_2O$—$(C_2H_4O)_b$—$(C_3H_6O)_c$—$R^5$.

In the above formula, $R^5$ is a substituted or unsubstituted monovalent hydrocarbon group or acyl group of 1 to 12 carbon atoms, the subscript 'b' is an integer from 2 to 30, the subscript 'c' is an integer from 0 to 20, and the oxyethylene unit and oxypropylene unit may form a block polymer or may form a random polymer. In particular, in order to impart excellent softness, water absorbency and durability to laundering, it is preferable for at least one $R^4$ group to be a polyoxyalkylene-containing organic group of the formula —$CH_2$—$CH(OH)CH_2O$—$(C_2H_4O)_b$—$(C_3H_6O)_c$—$R^5$ (wherein b, c and $R^5$ are as described above), and for one molecule to have two or more such polyoxyalkylene-containing organic groups thereon. Of the total number of $R^4$ groups, preferably at least 50%, more preferably at least 90%, and even more preferably 100%, are groups of the formula —$CH_2$—$CH(OH)CH_2O$—$(C_2H_4O)_b$—$(C_3H_6O)_c$—$R^5$.

Each $R^4$ group is independently a hydrogen atom, a substituted or unsubstituted monovalent hydrocarbon group or acyl group of 1 to 10 carbon atoms, or —$CH_2$—$CH(OH)CH_2O$—$(C_2H_4O)_b$—$(C_3H_6O)_c$—$R^5$. $R^5$ is a hydrogen atom, or a substituted or unsubstituted monovalent hydrocarbon group or acyl group of 1 to 12 carbon atoms, and preferably 1 to 8 carbon atoms. Illustrative examples of the monovalent hydrocarbon group include alkyl groups such as methyl, ethyl, propyl, butyl, pentyl, hexyl, heptyl, octyl, nonyl, decyl, dodecyl, tetradecyl, hexadecyl, octadecyl and eicosyl groups; cycloalkyl groups such as cyclopentyl and cyclohexyl groups; aryl groups such as phenyl and tolyl groups; alkenyl groups such as vinyl and allyl groups; and halogenated alkyl groups and halogenated alkenyl groups in which some or all carbon-bonded hydrogen atoms in the aforementioned groups are substituted with halogen atoms such as chlorine or fluorine. Of these, $R^5$ is preferably a hydrogen atom, an alkyl group such as methyl, ethyl, propyl or butyl, or an acyl group such as acetyl or benzoyl. Methyl, butyl and acetyl groups are especially preferred.

The subscript 'b' is an integer from 2 to 30, and preferably from 2 to 20. At a value for 'b' that is smaller than this lower limit, the hydrophilicity (water absorbency) imparting effect on textile fibers is inadequate; at a value for 'b' that is larger that this upper limit, the softness is inadequate. The subscript 'c' is an integer from 0 to 20, preferably from 0 to 10, and more preferably from 0 to 5. When 'c' is larger than this upper limit, the hydrophilicity (water absorbency of the fibers) is inadequate. The polyoxyethylene unit and polyoxypropylene unit may be a polymer of one type thereof or a copolymer of two types, or may be a block polymer or a random polymer.

The organopolysiloxane or silane of general formula (1) or (2) are exemplified as shown below.

[Chem. 6]

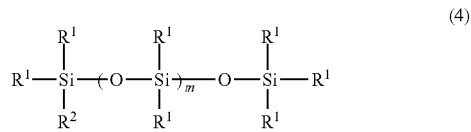

(4)

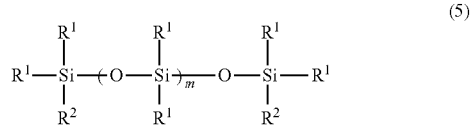

(5)

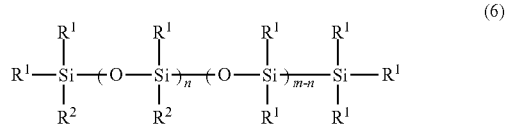

(6)

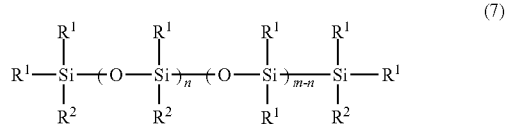

(7)

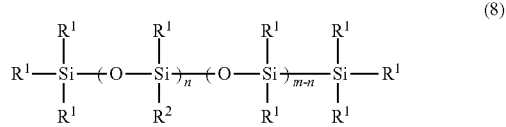

(8)

(9)

In these formulas, $R^1$, $R^2$ and m are as defined above, n is an integer below 40, and the sum m+n is less than 40, preferably from 0 to 30, more preferably from 0 to 20, and even more preferably from 1 to 20.

Of these, an organopolysiloxane of general formula (4) or (5) above is especially preferred. Specific examples include organopolysiloxanes of the following general formulas.

[Chem. 7]

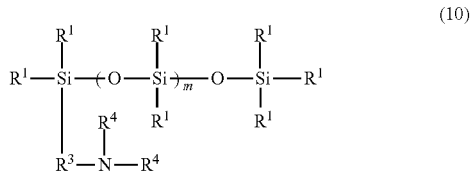

(10)

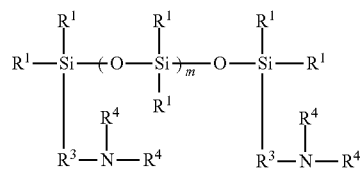

(11)

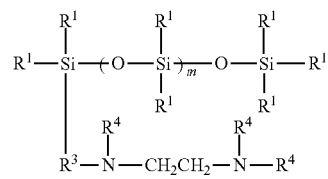

(12)

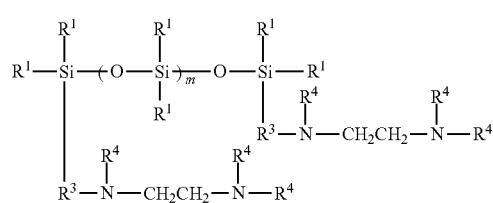

(13)

In the organopolysiloxanes of general formulas (10) to (13), each $R^1$ is independently a hydrogen atom, a hydroxyl group, a substituted or unsubstituted monovalent hydrocarbon group of 1 to 20 carbon atoms, or an alkoxy group of 1 to 10 carbon atoms. $R^1$ is preferably a hydroxyl group, a substituted or unsubstituted hydrocarbon group of 1 to 10 carbon atoms, or an alkoxy group of 1 to 5 carbon atoms, and more preferably a methyl, ethyl, methoxy or ethoxy group. Here, m, $R^3$, $R^4$, b, c and $R^5$, including their preferred ranges, are the same as described above.

[Method for Preparing Component A]

Component (A) can be obtained by a dealcoholation reaction between a dihydroxy-terminated dimethylpolysiloxane and 3-aminopropyldiethoxymethylsilane or N-(2-aminoethyl)-3-aminopropyldimethoxymethylsilane, either in the absence of a catalyst or in the presence of a catalyst such as an alkali metal hydroxide, followed by reaction with a polyoxyalkylene glycidyl ether of general formula (14) below.

[Chem. 8]

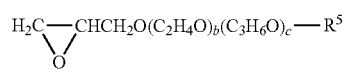

(14)

In the formula, b, c and $R^5$ are as defined above.

The reaction between an amino group-containing organopolysiloxane and polyoxyalkylene monoglycidyl ether may be carried out without particular limitation according to a known method. For example, the reaction may be carried out for 1 to 5 hours at between 50 and 100° C., either in the absence of solvent, or in the presence of a solvent such as a lower alcohol, toluene or xylene.

Component A can also be obtained by an equilibration reaction between a cyclic siloxane such as octamethylcyclotetrasiloxane and a compound selected from among 3-aminopropyldiethoxymethylsilane or N-(2-aminoethyl)-3-aminopropyldimethoxymethylsilane, hydrolyzates of these and, as other starting materials, hexamethyldisiloxane and the like, in the presence of a catalyst such as an alkali metal hydroxide or tetramethylammonium hydroxide, followed by reaction with a polyoxyalkylene glycidyl ether of above general formula (14). The reaction between an amino group-containing organopolysiloxane and a polyoxyalkylene monoglycidyl ether may be carried out without particular limitation according to a known method. For example, the reaction may be carried out in the absence of solvent or in the presence of a solvent such as a lower alcohol, toluene or xylene for 1 to 5 hours at between 50 and 100° C.

Examples of the polyoxyalkylene monoglycidyl ether of general formula (14) above include the following

[Chem. 9]

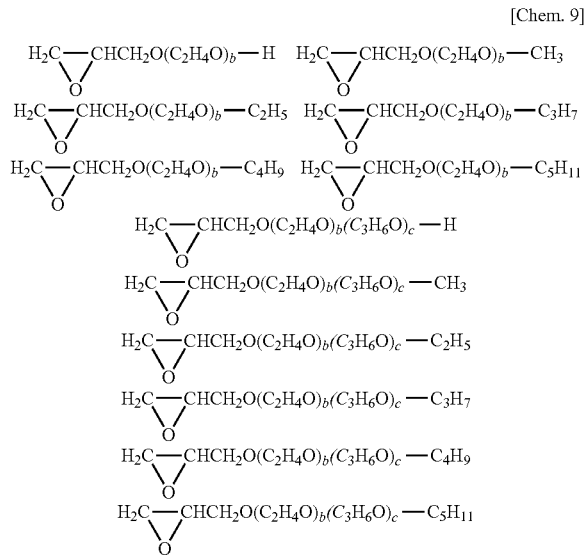

(wherein b and c are as defined above).

[Component B]

Component B is water. So long as it is water, component B is not particularly limited.

The composition of the invention includes (A) an organopolysiloxane of general formula (1) or a silane of general formula (2), and (B) water, these components being included in a weight ratio, expressed as [component A/(component A+component B)], of from 0.005 to 1, preferably from 0.01 to 0.5, and more preferably from 0.01 to 0.05. By setting the weight ratio within this range, the advantageous effects that are the object of the invention can be better obtained. When the above weight ratio is 1, component B is not included. The content of component A in the composition is preferably from 0.1 to 10 wt %, and more preferably from 1 to 5 wt %. The content of component B in the composition is preferably from 50 to 99 wt %, and more preferably from 90 to 99 wt %.

[Component C]

Adding (C) polyvinyl alcohol or modified polyvinyl alcohol to the composition of the invention further enhances the durability to laundering and the water absorbency, both before and after laundering. The weight ratio [component C/(component B+component C)] is preferably from 0.001 to 0.05, and more preferably from 0.001 to 0.01. The content of component C in the composition is preferably from 0.1 to 5 wt %, and more preferably from 0.1 to 3 wt %.

The composition of the invention may suitably include, within ranges that do not detract from the advantageous effects of the invention, various thickeners, pigments, dyes, penetrants, antistatic agents, defoamers, flame retardants, antimicrobial agents, preservatives, crosslinking agents, adhesion promoters, and also other silicone oils, silicone resins, acrylic resins and urethane resins. Emulsifying agent ingredients and surfactant ingredients need not be included.

The composition of the invention can be used in, but is not limited to, for example, textile treatments (e.g., textile hand-improving agents), binders for inorganic or organic substances (e.g., binders for functional inorganic fillers such as photocatalysts), paints, parting agents, backside treatments for pressure-sensitive adhesive sheets, surface coatings for various types of substrates, agents for imparting releasability or slip properties to the surface of rubber articles, and water repellency agents for paper and wood. Various known methods of application, including dipping, spraying, roll coating, bar coating and brushing, may be used to apply the composition onto a substrate.

[Textile Treatment]

The textile surface following treatment has excellent softness, exhibits water absorbency and moreover has an excellent durability, enabling the water absorbency of the textile surface to be maintained even after laundering and thus making the inventive composition useful as a textile treatment. The composition may be used directly as a textile treatment, or may be suitably included in a textile treatment in an amount within a range of, e.g., from 0.01 to 99 wt %. When textile fibers are to be treated, the textile treatment may be diluted and used, in which case the amount of the inventive composition included as the active ingredient within the diluted textile treatment for treating the fibers is preferably from 0.01 to 5 wt %, and more preferably from 0.1 to 1 wt %.

Treatment may be carried out on, for example textile fibers and textile products. The textile treatment of the invention is effective not only on natural fibers such as cotton, silk, linen, wool, angora and mohair, but also on synthetic fibers such as polypropylene, polyester, nylon, acrylics and spandex, on fibers obtained by combining, blending, weaving or twisting together such natural fibers and synthetic fibers, and on textile products obtained using any of the above. There is no limitation on the proportion of fibers obtained by combining, blending, weaving or twisting together natural fibers and synthetic fibers; use can be made of textile fibers and textile products containing such fibers in any proportion.

Nor are there any limitations on the form and shape of such textile fibers and textile products, the textile treatment of the invention being suitable for use in treating not only raw materials such as staple fiber, filament, tow and yarn, but also various processed forms such as knit fabric, woven fabric, batting, nonwoven fabric, paper, sheet and film.

[Treatment Method]

The method for treating various types of textile fibers and textile products using the textile treatment composition of the invention may include, for example, adjusting the component (A) concentration to a desired concentration of from 0.005 to 5 wt %, and preferably from 0.01 to 5 wt %, applying the composition to the fiber by such means as dipping, spraying or roll coating, and then drying the applied composition by hot air blowing, heat treatment or the like. An example of a preferred method is a method for treating textile fiber and textile products that includes the step of depositing component A on a textile fiber or textile product by coating the textile fiber or textile product with or dipping the textile fiber or textile product in the composition and subsequently drying at between 80 and 200° C. Although the conditions vary with the type of fiber, when dipping is carried out, it is desirable to set the immersion time to from 5 seconds to 5 minutes, preferably from 5 seconds to 1 minute, the drying temperature to between 80 and 200° C., preferably between 80 and 150° C., and the drying time to from 1 to 30 minutes, preferably from 1 to 10 minutes. The pickup differs with the type of fiber and is not particularly limited, although it is desirable to set the pickup, expressed in terms of the pure organopolysiloxane with respect to the textile fiber or product, in the range of 0.01 to 10 wt %.

[Textile Fiber or Textile Product]

A textile fiber or textile product having component (A) deposited thereon can be obtained using a method such as that described above to treat a textile fiber or textile product with the inventive composition.

EXAMPLES

Examples and Comparative Examples are given below by way of illustration and not by way of limitation. In these Examples, unless noted otherwise, all references to percent (%) and proportions in the formulations are by weight.

Production Example 1: Preparation of Aminoalkyl Group-Containing Polysiloxane

The interior of a four-neck flask equipped with a stirrer, a thermometer, a reflux condenser with attached Dean-Stark tube and a nitrogen inlet was placed under a nitrogen atmosphere, charged with 122.3 g of the organopolysiloxane of formula (a) below, 33.2 g of the organosilane of formula (b) below and 44.5 g of the organosilane of formula (c) below and, by holding the temperature within the reaction vessel at 130° C. while blowing in nitrogen and stirring, a dealcoholation reaction was effected while removing the alcohol that formed as a by-product. The system was cooled to 40° C., following which 174.8 g of the polyethylene glycol monobutyl monoglycidyl ether of formula (d) below (an amount such that the ratio of the number of glycidyl groups on the polyethylene glycol monobutyl monoglycidyl ether to the total number of nitrogen-bonded hydrogen atoms (—NH) on the aminoalkyl group-containing organopolysiloxane becomes 0.95) and 20.0 g of isopropyl alcohol were added and, by holding the temperature within the reaction vessel at 85° C. while sealing the system and stirring the flask contents under a nitrogen atmosphere, addition of the polyethylene glycol monobutyl monoglycidyl ether to the amino groups within the molecule was effected. Under reduced pressure and under stirring of the vessel contents while blowing in nitrogen, the temperature within the reaction vessel was held at 120° C. and isopropyl alcohol and unreacted ingredients were removed. The reaction mixture was then filtered, giving an aminoalkyl group-containing polysiloxane of formula (e) below. $R^6$ in formula (e) is a polyoxyethylene-containing organic group of the formula —$CH_2$—CH(OH)$CH_2$O—($C_2H_4O$)$_5$—$C_4H_9$. The resulting aminoalkyl group-containing polysiloxane had a viscosity at 25° C. of 200 mPa·s, a refractive index of 1.44, and an amine equivalent weight of 2,070 g/mol. The $^1$H-NMR spectrum of this compound was measured, whereupon unreacted glycidyl groups were not detected.

[Chem. 10]

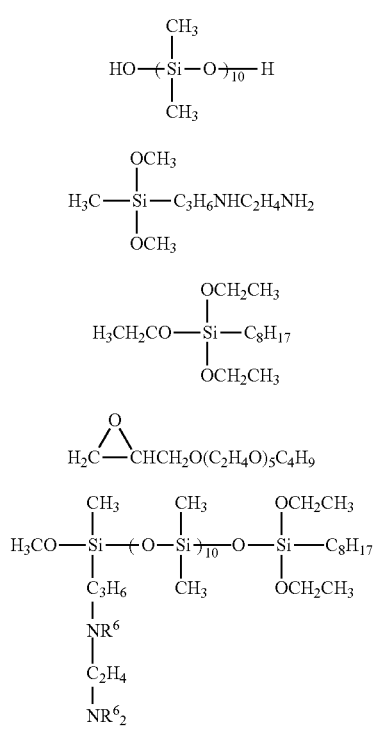

Production Example 2: Preparation of Aminoalkyl Group-Containing Polysiloxane Using an apparatus like that in Production Example 1, the interior of the four-neck flask was placed under a nitrogen atmosphere and charged with 151.3 g of the organopolysiloxane of formula (f) below, 20.8 g of the organosilane of formula (b) above and 27.9 g of the organosilane of formula (c) above and, by holding the temperature within the reaction vessel at 130° C. while blowing in nitrogen and stirring, a dealcoholation reaction was effected while removing the alcohol that formed as a by-product. The system was cooled to 40° C., following which 109.5 g of the polyethylene glycol monobutyl monoglycidyl ether of formula (d) above (an amount such that the ratio of the number of glycidyl groups on the polyethylene glycol monobutyl monoglycidyl ether to the total number of nitrogen-bonded hydrogen atoms (—NH) on the aminoalkyl group-containing organopolysiloxane becomes 0.95) and 16.3 g of isopropyl alcohol were added and, by holding the temperature within the reaction vessel at 85° C. while sealing the system and stirring the flask contents under a nitrogen atmosphere, addition of the polyethylene glycol monobutyl monoglycidyl ether to the amino groups within the molecule was effected. Under reduced pressure and under stirring of the vessel contents while blowing in nitrogen, the temperature within the reaction vessel was held at 120° C. and isopropyl alcohol and unreacted ingredients were removed. The reaction mixture was then filtered, giving an aminoalkyl group-containing polysiloxane of formula (g) below. $R^6$ in formula (g) is a polyoxyethylene-containing organic group of the formula —$CH_2$—$CH(OH)CH_2O$—$(C_2H_4O)_5$—$C_4H_9$. The resulting aminoalkyl group-containing polysiloxane had a viscosity at 25° C. of 360 mPa·s, a refractive index of 1.44, and an amine equivalent weight of 2,610 g/mol. The $^1$H-NMR spectrum of this compound was measured, whereupon unreacted glycidyl groups were not detected.

[Chem. 11]

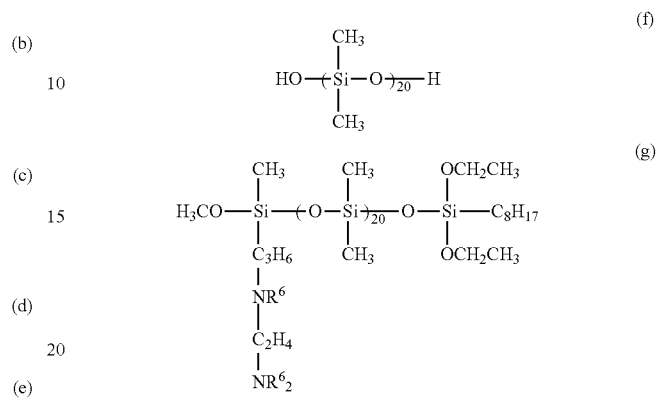

Production Example 3: Preparation of Aminoalkyl Group-Containing Polysiloxane (Comparative Product)

Using an apparatus like that in Production Example 1, the interior of the four-neck flask was placed under a nitrogen atmosphere and charged with 172.2 g of the organopolysiloxane of formula (h) below, 11.9 g of the organosilane of formula (b) above and 16.0 g of the organosilane of formula (c) above and, by holding the temperature within the reaction vessel at 130° C. while blowing in nitrogen and stirring, a dealcoholation reaction was effected while removing the alcohol that formed as a by-product. The system was cooled to 40° C., following which 62.6 g of the polyethylene glycol monobutyl monoglycidyl ether of formula (d) above (an amount such that the ratio of the number of glycidyl groups on the polyethylene glycol monobutyl monoglycidyl ether to the total number of nitrogen-bonded hydrogen atoms (—NH) on the aminoalkyl group-containing organopolysiloxane becomes 0.95) and 13.8 g of isopropyl alcohol were added and, by holding the temperature within the reaction vessel at 85° C. while sealing the system and stirring the flask contents under a nitrogen atmosphere, addition of the polyethylene glycol monobutyl monoglycidyl ether to the amino groups within the molecule was effected. Under reduced pressure and under stirring of the vessel contents while blowing in nitrogen, the temperature within the reaction vessel was held at 120° C. and isopropyl alcohol and unreacted ingredients were removed. The reaction mixture was then filtered, giving an aminoalkyl group-containing polysiloxane of formula (i) below. $R^6$ in formula (i) is a polyoxyethylene-containing organic group of the formula —$CH_2$—$CH(OH)CH_2O$—$(C_2H_4O)_5$—$C_4H_9$. The resulting aminoalkyl group-containing polysiloxane had a viscosity at 25° C. of 2,450 mPa·s, a refractive index of 1.42, and an amine equivalent weight of 4,140 g/mol. The $^1$H-NMR spectrum of this compound was measured, whereupon unreacted glycidyl groups were not detected.

[Chem. 12]

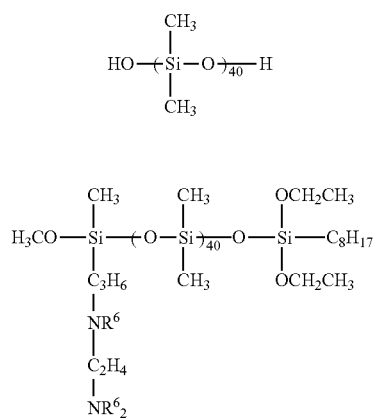

(h)

(i)

Production Example 4: Preparation of Aminoalkyl Group-Containing Polysiloxane Using an apparatus like that in Production Example 1, the interior of the four-neck flask was placed under a nitrogen atmosphere and charged with 100.2 g of the organopolysiloxane of formula (a) above and 55.6 g of the organosilane of formula (b) above and, by holding the temperature within the reaction vessel at 130° C. while blowing in nitrogen and stirring, a dealcoholation reaction was effected while removing the alcohol that formed as a by-product. The system was cooled to 40° C., following which 92.2 g of the polyethylene glycol monobutyl monoglycidyl ether of formula (d) above (an amount such that the ratio of the number of glycidyl groups on the polyethylene glycol monobutyl monoglycidyl ether to the total number of nitrogen-bonded hydrogen atoms (—NH) on the aminoalkyl group-containing organopolysiloxane becomes 0.95) and 24.0 g of isopropyl alcohol were added and, by holding the temperature within the reaction vessel at 85° C. while sealing the system and stirring the flask contents under a nitrogen atmosphere, addition of the polyethylene glycol monobutyl monoglycidyl ether to the amino groups within the molecule was effected. Under reduced pressure and under stirring of the vessel contents while blowing in nitrogen, the temperature within the reaction vessel was held at 120° C. and isopropyl alcohol and unreacted ingredients were removed. The reaction mixture was then filtered, giving an aminoalkyl group-containing polysiloxane of formula (j) below. $R^6$ in formula (j) is a polyoxyethylene-containing organic group of the formula —$CH_2$—$CH(OH)CH_2O$—$(C_2H_4O)_5$—$C_4H_9$. The resulting aminoalkyl group-containing polysiloxane had a viscosity at 25° C. of 380 mPa·s, a refractive index of 1.46, and an amine equivalent weight of 1,640 g/mol. The $^1$H-NMR spectrum of this compound was measured, whereupon unreacted glycidyl groups were not detected.

[Chem. 13]

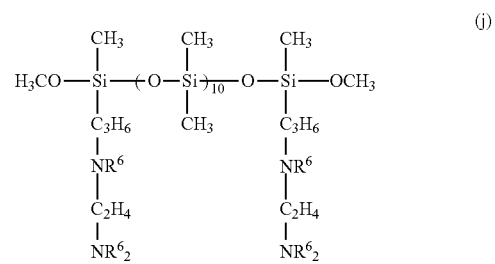

(j)

Production Example 5: Preparation of Aminoalkyl Group-Containing Polysiloxane Using an apparatus like that in Production Example 1, the interior of the four-neck flask was placed under a nitrogen atmosphere and charged with 141.2 g of the organopolysiloxane of formula (f) above and 38.8 g of the organosilane of formula (b) above and, by holding the temperature within the reaction vessel at 130° C. while blowing in nitrogen and stirring, a dealcoholation reaction was effected while removing the alcohol that formed as a by-product. The system was cooled to 40° C., following which 204.2 g of the polyethylene glycol monobutyl monoglycidyl ether of formula (d) above (an amount such that the ratio of the number of glycidyl groups on the polyethylene glycol monobutyl monoglycidyl ether to the total number of nitrogen-bonded hydrogen atoms (—NH) on the aminoalkyl group-containing organopolysiloxane becomes 0.95) and 20.2 g of isopropyl alcohol were added and, by holding the temperature within the reaction vessel at 85° C. while sealing the system and stirring the flask contents under a nitrogen atmosphere, addition of the polyethylene glycol monobutyl monoglycidyl ether to the amino groups within the molecule was effected. Under reduced pressure and under stirring of the vessel contents while blowing in nitrogen, the temperature within the reaction vessel was held at 120° C. and isopropyl alcohol and unreacted ingredients were removed. The reaction mixture was then filtered, giving an aminoalkyl group-containing polysiloxane of formula (k) below. $R^6$ in formula (k) is a polyoxyethylene-containing organic group of the formula —$CH_2$—$CH(OH)CH_2O$—$(C_2H_4O)_5$—$C_4H_9$. The resulting aminoalkyl group-containing polysiloxane had a viscosity at 25° C. of 400 mPa·s, a refractive index of 1.45, and an amine equivalent weight of 1,870 g/mol. The $^1$H-NMR spectrum of this compound was measured, whereupon unreacted glycidyl groups were not detected.

[Chem. 14]

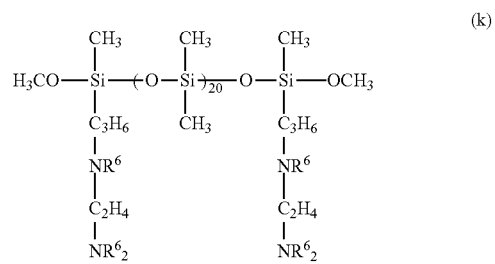

(k)

Production Example 6: Preparation of Aminoalkyl Group-Containing Polysiloxane (Comparative Product)

Using an apparatus like that in Production Example 1, the interior of the four-neck flask was placed under a nitrogen atmosphere and charged with 239.4 g of the organopolysiloxane of formula (h) above and 26.5 g of the organosilane of formula (b) above and, by holding the temperature within the reaction vessel at 130° C. while blowing in nitrogen and stirring, a dealcoholation reaction was effected while removing the alcohol that formed as a by-product. The system was cooled to 40° C., following which 124.3 g of the polyethylene glycol monobutyl monoglycidyl ether of formula (d) above (an amount such that the ratio of the number of glycidyl groups on the polyethylene glycol monobutyl monoglycidyl ether to the total number of nitrogen-bonded hydrogen atoms (—NH) on the aminoalkyl group-containing organopolysiloxane becomes 0.95) and 9.8 g of isopropyl alcohol were added and, by holding the temperature within the reaction vessel at 85° C. while sealing the system and stirring the flask contents under a nitrogen atmosphere, addition of the polyethylene glycol monobutyl monoglycidyl ether to the amino groups within the molecule was effected. Under reduced pressure and under stirring of the vessel contents while blowing in nitrogen, the temperature within the reaction vessel was held at 120° C. and isopropyl alcohol and unreacted ingredients were removed. The reaction mixture was then filtered, giving an aminoalkyl group-containing polysiloxane of formula (1) below. $R^6$ in formula (1) is a polyoxyethylene-containing organic group of the formula —$CH_2$—$CH(OH)CH_2O$—$(C_2H_4O)_5$—$C_4H_9$. The resulting aminoalkyl group-containing polysiloxane had a viscosity at 25° C. of 720 mPa·s, a refractive index of 1.43, and an amine equivalent weight of 3,090 g/mol. The $^1$H-NMR spectrum of this compound was measured, whereupon unreacted glycidyl groups were not detected.

[Chem. 15]

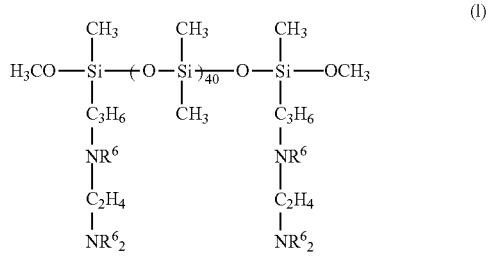

(l)

Production Example 7: Preparation of Aminoalkyl Group-Containing Polysiloxane (Comparative Product)

Using an apparatus like that in Production Example 1, the interior of the four-neck flask was placed under a nitrogen atmosphere and charged with 194.4 g of the organopolysiloxane of formula (a) above and 105.6 g of the organosilane of formula (b) above and, by holding the temperature within the reaction vessel at 130° C. while blowing in nitrogen and stirring, a dealcoholation reaction was effected while removing the alcohol that formed as a by-product. Under reduced pressure and under stirring of the vessel contents while blowing in nitrogen, the temperature within the reaction vessel was held at 120° C. and unreacted ingredients were removed. The reaction mixture was then filtered, giving an aminoalkyl group-containing polysiloxane of formula (m) below. The resulting aminoalkyl group-containing polysiloxane had a viscosity at 25° C. of 20 mPa·s, a refractive index of 1.42, and an amine equivalent weight of 280 g/mol.

[Chem. 16]

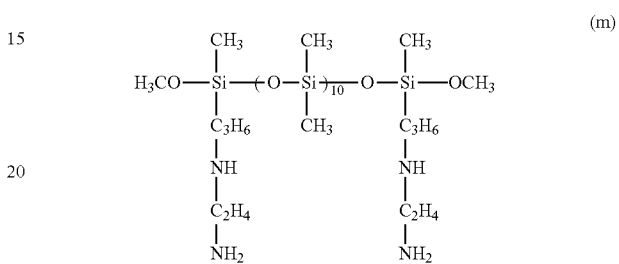

(m)

Production Example 8: Preparation of Aminoalkyl Group-Containing Polysiloxane Using an apparatus like that in Production Example 1, the interior of the four-neck flask was placed under a nitrogen atmosphere and charged with 98.4 g of the organopolysiloxane of formula (a) above and 53.5 g of the organosilane of formula (b) above and, by holding the temperature within the reaction vessel at 130° C. while blowing in nitrogen and stirring, a dealcoholation reaction was effected while removing the alcohol that formed as a by-product. The system was cooled to 40° C., following which 148.1 g of the polyethylene glycol monobutyl monoglycidyl ether of formula (d) above (an amount such that the ratio of the number of glycidyl groups on the polyethylene glycol monobutyl monoglycidyl ether to the total number of nitrogen-bonded hydrogen atoms (—NH) on the aminoalkyl group-containing organopolysiloxane becomes 0.50) and 16.0 g of isopropyl alcohol were added and, by holding the temperature within the reaction vessel at 85° C. while sealing the system and stirring the flask contents under a nitrogen atmosphere, addition of the polyethylene glycol monobutyl monoglycidyl ether to the amino groups within the molecule was effected. Under reduced pressure and under stirring of the vessel contents while blowing in nitrogen, the temperature within the reaction vessel was held at 120° C. and isopropyl alcohol and unreacted ingredients were removed. The reaction mixture was then filtered, giving an aminoalkyl group-containing polysiloxane of formula (j) below. $R^6$ in formula (j) is a hydrogen atom or a polyoxyethylene-containing organic group of the formula —$CH_2$—$CH(OH)CH_2O$—$(C_2H_4O)_5$—$C_4H_9$, the ratios of these being respectively 50% and 50% The resulting aminoalkyl group-containing polysiloxane had a viscosity at 25° C. of 130 mPa·s, a refractive index of 1.44, and an amine equivalent weight of 850 g/mol. The $^1$H-NMR spectrum of this compound was measured, whereupon unreacted glycidyl groups were not detected.

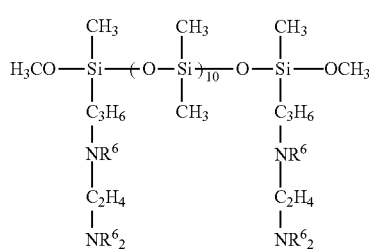

(j)

Production Example 9: Preparation of Aminoalkyl Group-Containing Polysiloxane Using an apparatus like that in Production Example 3, the interior of the four-neck flask was placed under a nitrogen atmosphere and charged with 82.2 g of the organopolysiloxane of formula (a) above and 44.7 g of the organosilane of formula (b) above and, by holding the temperature within the reaction vessel at 130° C. while blowing in nitrogen and stirring, a dealcoholation reaction was effected while removing the alcohol that formed as a by-product. The system was cooled to 40° C., following which 173.1 g of the polyethylene glycol monobutyl monoglycidyl ether of formula (d) above (an amount such that the ratio of the number of glycidyl groups on the polyethylene glycol monobutyl monoglycidyl ether to the total number of nitrogen-bonded hydrogen atoms (—NH) on the aminoalkyl group-containing organopolysiloxane becomes 0.70) and 16.0 g of isopropyl alcohol were added and, by holding the temperature within the reaction vessel at 85° C. while sealing the system and stirring the flask contents under a nitrogen atmosphere, addition of the polyethylene glycol monobutyl monoglycidyl ether to the amino groups within the molecule was effected. Under reduced pressure and under stirring of the vessel contents while blowing in nitrogen, the temperature within the reaction vessel was held at 120° C. and isopropyl alcohol and unreacted ingredients were removed. The reaction mixture was then filtered, giving an aminoalkyl group-containing polysiloxane of formula (j) below. $R^6$ in formula (j) is a hydrogen atom or a polyoxyethylene-containing organic group of the formula —$CH_2$—$CH(OH)CH_2O$—$(C_2H_4O)_5$—$C_4H_9$, the ratios of these being respectively 30% and 70% The resulting aminoalkyl group-containing polysiloxane had a viscosity at 25° C. of 220 mPa·s, a refractive index of 1.44, and an amine equivalent weight of 1,170 g/mol. The $^1$H-NMR spectrum of this compound was measured, whereupon unreacted glycidyl groups were not detected.

[Chem. 18]

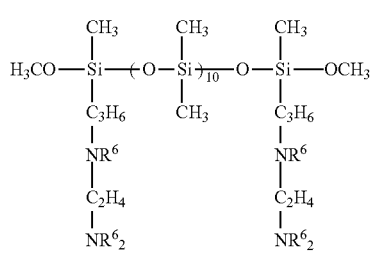

(j)

Examples 1 to 9, Comparative Examples 1 to 3

Compositions formulated as shown in Table 1 were prepared. The resulting compositions were used as test fluids.

TABLE 1

| Formulation | (A) Silicone oil | | | |
|---|---|---|---|---|
| (pbw) | Type | pbw | (B) Water | A/[A + B] |
| Example 1 | Production Example 1 | 1 | 99 | 0.01 |
| Example 2 | Production Example 2 | 1 | 99 | 0.01 |
| Example 3 | Production Example 4 | 1 | 99 | 0.01 |
| Example 4 | Production Example 5 | 1 | 99 | 0.01 |
| Example 5 | Production Example 8 | 1 | 99 | 0.01 |
| Example 6 | Production Example 9 | 1 | 99 | 0.01 |
| Example 7 | Production Example 4 | 5 | 95 | 0.05 |
| Example 8 | Production Example 4 | 10 | 90 | 0.1 |
| Example 9 | Production Example 4 | 100 | 0 | 1 |
| Comparative Example 1 | Production Example 3 | 1 | 99 | 0.01 |
| Comparative Example 2 | Production Example 6 | 1 | 99 | 0.01 |
| Comparative Example 3 | Production Example 7 | 1 | 99 | 0.01 |

Examples 10 and 11, Comparative Examples 4 and 5

Compositions formulated as shown in Table 2 were prepared. The resulting compositions were used as test fluids. Gohsenol EG-40 (from Nippon Synthetic Chemical Industry Co., Ltd.) was used as the polyvinyl alcohol.

TABLE 2

| Formulation | (A) Silicone oil | | 1% Polyvinyl alcohol | | |
|---|---|---|---|---|---|
| (pbw) | Type | pbw | solution (aq.) | A/[A + B] | C/[B + C] |
| Example 10 | Production Example 1 | 1 | 99 | 0.01 | 0.01 |
| Example 11 | Production Example 4 | 1 | 99 | 0.01 | 0.01 |
| Comparative Example 4 | Production Example 3 | 1 | 99 | 0.01 | 0.01 |
| Comparative Example 5 | Production Example 6 | 1 | 99 | 0.01 | 0.01 |

[Evaluation Test 1: Water Absorbency Test]

A polypropylene (PP) nonwoven fabric (Maeda Kosen Co., Ltd.) was dipped for 10 seconds in the test fluid, after which the fabric was squeezed using rolls at a degree of expression of 100% and dried for 2 minutes at 150° C. A single drop (25 μL) of tap water was deposited onto the treated fabric with a dropping pipette, and the time in seconds until the drop is completely absorbed by the fabric was measured. The amount of silicone remaining on the fiber surfaces of the treated fabric was measured with a fluorescence x-ray spectrometer (Rigaku Corporation).

[Evaluation Test 2: Laundering Durability Test (Percent Retention]

A polypropylene (PP) nonwoven fabric (Maeda Kosen Co., Ltd.) was dipped for 10 seconds in the test fluid, after which the fabric was squeezed using rolls at a degree of expression of 100% and dried for 2 minutes at 150° C. The treated fabric was then washed once with a washing machine by a procedure in accordance with JIS L0217 103. A single drop (25 µL) of tap water was deposited onto the treated fabric with a dropping pipette, and the time in seconds until the drop is completely absorbed by the fabric was measured. In addition, the amount of silicone remaining on the fiber surfaces after one wash was measured with a fluorescence x-ray spectrometer (Rigaku Corporation). The retention (%) was calculated from this amount relative to the amount of silicone that remains on the fiber surfaces when washing is not carried out.

[Evaluation Test 3: Softness Test]

A polypropylene (PP) nonwoven fabric (Maeda Kosen Co., Ltd.) was dipped for 10 seconds in the test fluid, after which the fabric was squeezed using rolls at a degree of expression of 100% and dried for 2 minutes at 150° C. The treated fabric was then washed once with a washing machine by a procedure in accordance with JIS L0217 103. A panel of three judges tested the treated fabric by touching it with their hands and rated the softness according to the following criteria.

A: Very pleasant to the touch
B: Pleasant to the touch
C: Unpleasant to the touch

TABLE 3

| PP nonwoven fabric | Water absorbency (seconds) Before washing | After washing | Retention (%) | Softness |
|---|---|---|---|---|
| Example 1 | up to 2 | up to 2 | 29 | A |
| Example 2 | 5 | up to 2 | 21 | A |
| Example 3 | up to 2 | up to 2 | 56 | A |
| Example 4 | up to 2 | up to 2 | 37 | A |
| Example 5 | up to 2 | up to 2 | 22 | A |
| Example 6 | up to 2 | up to 2 | 45 | A |
| Example 7 | up to 2 | up to 2 | 40 | A |
| Example 8 | up to 2 | up to 2 | 17 | A |
| Example 9 | up to 2 | up to 2 | 15 | A |
| Example 10 | up to 2 | up to 2 | 60 | A |
| Example 11 | up to 2 | up to 2 | 71 | A |
| Comparative Example 1 | up to 2 | 600 or more | 5 | A |
| Comparative Example 2 | 5 | 600 or more | 2 | A |
| Comparative Example 3 | measurement was impossible due to partial gelling of test fluid | | | |
| Comparative Example 4 | 10 | 600 or more | 12 | A |
| Comparative Example 5 | 5 | 600 or more | 10 | A |
| Untreated | 600 or more | 600 or more | — | B |

As shown in Table 3, the silicone compositions of the invention, after being used to treat a polypropylene nonwoven fabric, imparted a high water absorbency and good softness. Moreover, the durability to laundering was excellent, enabling a high water absorbency to be maintained even after washing. The reason is thought to be that, due to heat treatment, alkoxy groups and hydroxyl groups present within the silicone molecules undergo condensation reactions between the molecules, leading to the formation of a tough film that can withstand washing. In addition, it is possible that adding polyvinyl alcohol to the composition further improves the water absorbency and durability to laundering, presumably because the formation of a polyvinyl alcohol film in addition to a silicone film further increases the film strength. Also, silicones to which polyethylene glycol monobutyl monoglycidyl ether addition has not been carried out have very low water solubility, and so test fluids are difficult to prepare. By contrast, silicones in which polyethylene glycol monobutyl monoglycidyl ether was added to a portion of the amino groups had increased water solubility, enabling test fluids to be prepared, and the water absorbency and retention results were also good. Moreover, with increases in the percent addition, a trend toward higher retention after washing was observed.

[Evaluation Test 4: Water Absorbency Test]

A polyester/cotton broadcloth (T/C cloth; 65%/35%, from Tanigashira Shoten) and a cotton broadcloth (C cloth, 100%, from Tanigashira Shoten) were dipped for 10 seconds in the test fluids of Examples 1 to 4, 10 and 11 and of Comparative Examples 2 and 5, after which the cloth was squeezed using rolls at a degree of expression ratio of 100% and dried for 2 minutes at 150° C. A single drop (25 µL) of tap water was deposited onto the treated cloth with a dropping pipette, and the time in seconds until the drop is completely absorbed by the cloth was measured. The amount of silicone remaining on the fiber surfaces of the treated cloth was measured with a fluorescence x-ray spectrometer (Rigaku Corporation).

[Evaluation Test 5: Laundering Durability Test]

A polyester/cotton broadcloth (T/C cloth; 65%/35%, from Tanigashira Shoten) and a cotton broadcloth (C cloth, 100%, from Tanigashira Shoten) were dipped for 10 seconds in the test fluids of Examples 1 to 4, 10 and 11 and of Comparative Examples 2 and 5, after which the cloth was squeezed using rolls at a degree of expression ratio of 100% and dried for 2 minutes at 150° C. The treated cloth was then washed once with a washing machine by a procedure in accordance with JIS L0217 103. A single drop (25 µL) of tap water was deposited onto the treated cloth with a dropping pipette, and the time in seconds until the drop is completely absorbed by the cloth was measured. In addition, the amount of silicone remaining on the fiber surfaces after one wash was measured with a fluorescence x-ray spectrometer (Rigaku Corporation). The retention (%) was calculated from this amount relative to the amount of silicone that remains on the fiber surfaces when washing is not carried out.

[Evaluation Test 6: Softness Test]

A polyester/cotton broadcloth (T/C cloth; 65%/35%, from Tanigashira Shoten) and a cotton broadcloth (C cloth, 100%, from Tanigashira Shoten) were dipped for 10 seconds in the test fluids of Examples 1 to 4, 10 and 11 and of Comparative Examples 2 and 5, after which the cloth was squeezed using rolls at a degree of expression of 100% and dried for 2 minutes at 150° C. The treated cloth was then washed once with a washing machine by a procedure in accordance with JIS L0217 103. A panel of three judges tested the treated cloth by touching it with their hands and rated the softness according to the following criteria.

A: Very pleasant to the touch

B: Pleasant to the touch

C: Unpleasant to the touch

TABLE 4

| T/C cloth | Water absorbency (seconds) | | Retention (%) | Softness |
|---|---|---|---|---|
| | Before washing | After washing | | |
| Example 1 | up to 2 | up to 2 | 45 | A |
| Example 2 | 3 | 4 | 40 | A |
| Example 3 | up to 2 | up to 2 | 96 | A |
| Example 4 | up to 2 | up to 2 | 95 | A |
| Example 10 | up to 2 | up to 2 | 32 | A |
| Example 11 | up to 2 | up to 2 | 26 | A |
| Comparative Example 2 | 20 | 57 | 3 | A |
| Comparative Example 5 | 12 | 36 | 12 | A |
| Untreated | 15 | 13 | — | B |

TABLE 5

| C cloth | Water absorbency (seconds) | | Retention (%) | Softness |
|---|---|---|---|---|
| | Before washing | After washing | | |
| Example 1 | up to 2 | up to 2 | 45 | A |
| Example 2 | up to 2 | up to 2 | 41 | A |
| Example 3 | up to 2 | up to 2 | 42 | A |
| Example 4 | up to 2 | up to 2 | 7 | A |
| Example 10 | up to 2 | up to 2 | 19 | A |
| Example 11 | up to 2 | up to 2 | 27 | A |
| Comparative Example 2 | 15 | 6 | 42 | A |
| Comparative Example 5 | 9 | 5 | 46 | A |
| Untreated | 3 | 2 | — | B |

As shown in Tables 4 and 5, the silicone compositions of the invention impart high water absorbency and good softness following the treatment of T/C cloth and C cloth as well, and moreover have excellent laundering durabilities, enabling a high water absorbency to be maintained even after washing. These results demonstrate that textile treatments in which silicone compositions of the invention serve as the active ingredient have excellent versatility.

INDUSTRIAL APPLICABILITY

By using the silicone compositions of the invention as textile treatments, good softness and water absorbency can be imparted to textile fibers. Also, because these compositions have an excellent durability to laundering, it is possible to maintain good softness and water absorbency even after washing. In addition, the silicone compositions of the invention also have excellent versatility and can be used not only in textile fibers and products such as cotton broadcloths that readily exhibit a relatively high water absorbency even after washing, but also in polyester/cotton broadcloths and polypropylene nonwoven fabrics which have hitherto been regarded as not readily exhibiting a high water absorbency after washing.

The invention claimed is:

1. A composition comprising:
   (A) an organopolysiloxane of general formula (1) below

[Chem. 1]

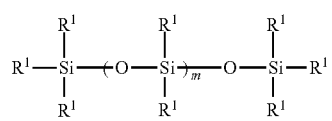

(1)

wherein each $R^1$ is independently a hydrogen atom, a hydroxyl group, a substituted or unsubstituted monovalent hydrocarbon group of 1 to 20 carbon atoms, an alkoxy group of 1 to 10 carbon atoms or an $R^2$ group, with the proviso that at least one $R^1$ is an $R^2$ group; the subscript 'm' is an integer of less than 40; and $R^2$ is a moiety of general formula (3) below

[Chem. 2]

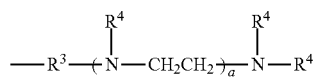

(3)

wherein $R^3$ is a divalent hydrocarbon group of 1 to 8 carbon atoms, the subscript 'a' is an integer from 0 to 4, each $R^4$ is independently a hydrogen atom, a substituted or unsubstituted monovalent hydrocarbon group or acyl group of 1 to 10 carbon atoms, or a polyoxyalkylene-containing organic group of the formula $-CH_2-CH(OH)CH_2O-(C_2H_4O)_b-(C_3H_6O)_c-R^5$ wherein $R^5$ is a hydrogen atom or a substituted or unsubstituted monovalent hydrocarbon group or acyl group of 1 to 12 carbon atoms; the subscript 'b' is an integer from 2 to 30; the subscript 'c' is an integer from 0 to 20; and the oxyethylene unit and oxypropylene unit may form a block polymer or may form a random polymer, with the proviso that at least one $R^4$ is $-CH_2-CH(OH)CH_2O-(C_2H_4O)_b-(C_3H_6O)_c-R^5$, (B) water, and (C) polyvinyl alcohol or modified polyvinyl alcohol, wherein components A and B are included in a weight ratio, expressed as [component A/(component A+component B)], of from 0.005 to 1 and components B and C are included in a weight ratio, expressed as [component C/(component B+component C)], of from 0.001 to 0.05, and the composition contains no emulsifying agent ingredients and surfactant ingredients.

2. The composition of claim 1, wherein the subscript 'm' in general formula (1) is an integer from 0 to 30.

3. The composition of claim 1, wherein at least 50% of the total number of $R^4$ groups in component A are groups of the formula $-CH_2-CH(OH)CH_2O-(C_2H_4O)_b-(C_3H_6O)_c-R^5$.

4. A textile treatment comprising, as an active ingredient, the composition of claim 1.

5. A method for treating textile fibers and textile products, comprising the step of depositing component A on a textile fiber or textile product by coating the textile fiber or textile product with or dipping the textile fiber or textile product in the composition of claim 1 and subsequently drying at between 80 and 200° C.

6. A textile fiber or textile product treated with the composition of claim 1.

\* \* \* \* \*